United States Patent [19]
Rolke et al.

[11] Patent Number: 5,895,520
[45] Date of Patent: Apr. 20, 1999

[54] METHOD OF SEPARATING NOXIOUS SUBSTANCES FROM EXHAUST GASES

[75] Inventors: Dietrich Rolke, Hofheim; Volker Hohmann, Maintal; Hans-Jochen Fell, Bad Homburg, all of Germany

[73] Assignee: Metallgesellschaft Aktiengesellschaft, Frankfurt am Main, Germany

[21] Appl. No.: 08/898,308

[22] Filed: Jul. 22, 1997

[51] Int. Cl.$^6$ .................................... B01D 53/04
[52] U.S. Cl. .................. 95/132; 95/134; 95/900
[58] Field of Search .................. 95/132–134, 900, 95/901; 96/108, 130, 132, 134, 135, 143, 144, 153

[56] References Cited

U.S. PATENT DOCUMENTS

| | | | |
|---|---|---|---|
| 3,853,516 | 12/1974 | Lyshkow | 96/132 X |
| 3,876,393 | 4/1975 | Kasai et al. | 95/134 |
| 3,946,101 | 3/1976 | Harendza-Harinxma | 96/153 X |
| 4,094,777 | 6/1978 | Sugier et al. | 95/134 X |
| 4,500,327 | 2/1985 | Nishino et al. | 95/134 |
| 4,518,704 | 5/1985 | Okabayashi et al. | 96/153 X |
| 4,762,537 | 8/1988 | Fleming et al. | 95/132 |
| 4,855,276 | 8/1989 | Osborne et al. | 95/132 X |
| 4,869,739 | 9/1989 | Kanome et al. | 96/153 |
| 5,141,724 | 8/1992 | Audeh et al. | 95/134 X |
| 5,264,013 | 11/1993 | Brentrup | 95/134 X |
| 5,308,590 | 5/1994 | Kersey et al. | 422/170 |
| 5,354,357 | 10/1994 | Markovs et al. | 95/134 X |
| 5,354,363 | 10/1994 | Brown, Jr. et al. | 95/133 X |
| 5,379,681 | 1/1995 | Rollen | 96/135 X |
| 5,421,860 | 6/1995 | Bretz et al. | 96/153 X |
| 5,536,302 | 7/1996 | Golden et al. | 96/153 X |
| 5,569,436 | 10/1996 | Lerner | 95/134 X |
| 5,587,138 | 12/1996 | Bobik et al. | 95/132 X |

FOREIGN PATENT DOCUMENTS

| | | | |
|---|---|---|---|
| 0405290 | 1/1991 | European Pat. Off. | 95/132 |
| 0479350A1 | 4/1992 | European Pat. Off. | |
| 4326450 | 2/1995 | Germany | 95/134 |
| 4339072A1 | 5/1995 | Germany | |
| 4339777A1 | 5/1995 | Germany | |
| 9417900 | 8/1994 | WIPO | |

*Primary Examiner*—Robert Spitzer
*Attorney, Agent, or Firm*—Sprung Kramer Schaefer & Briscoe

[57] ABSTRACT

The exhaust gas stream is passed through a bed of a granular adsorbent for separating noxious substances. The bed consists of the mixture of a granular high-carbon material and a granular inert material. The bulk density of the inert material is 0.8 to 3 times the bulk density of the carbonaceous material. Preferably, the content of the high-carbon material in the bed is 5 to 80 wt-%. The high-carbon material may for instance be activated carbon, activated coke or lignite coke. As inert material there may for instance be used siliceous rock, pumice, lava, slag, vitrification residues or fine gravel.

6 Claims, No Drawings

METHOD OF SEPARATING NOXIOUS SUBSTANCES FROM EXHAUST GASES

DESCRIPTION

This invention relates to a method of separating noxious substances from an exhaust gas stream which is passed through a bed of a granular adsorbent. The noxious substances preferably include mercury or mercury compounds, but also polycyclic or polynuclear aromatic hydrocarbons, in particular dioxins and furans as well as other heavy metals and/or heavy metal compounds.

The removal of in particular metallic mercury from gases is known; in the U.S. Pat. Nos. 4,101,631; 4,500,327; and 4,814,152 zeolites or activated carbon impregnated with sulfur are used for this purpose. In the method known from DE-A-4326450 low-aluminum zeolites are employed, which may likewise be impregnated with sulfur.

Gases of various origin, in particular exhaust gases from waste incineration plants, contain for instance dust, unburnt hydrocarbons, hydrogen halides, as well as sulfur oxides, nitrogen oxides, heavy metals and heavy metal compounds, but also dioxins and furans. For separating these substances, various cleaning methods are used. In particular for separating mercury and mercury compounds as well as dioxins and furans an additional separation stage is usually required as last stage before the chimney. For this purpose, carbonaceous powders or beds of granular activated carbon or granular activated coke may be used. A disadvantage of these carbonaceous materials is the latent risk of fire, where self-ignition is also possible. Moreover, the co-adsorption of other gas constituents, such as trace amounts of $SO_2$, often leads to the quick depletion and sooting or caking of the adsorbent, so that it must frequently be changed.

It is the object underlying the invention to overcome the risk of fire and the problem of sooting and caking in the bed in the above-stated method. In accordance with the invention this object is solved in that the bed consists of the mixture of a granular high-carbon material and a granular inert material, where the bulk density of the inert material is 0.8 to 3 times the bulk density of the carbonaceous material. Adding the inert material provides for long dwell times and in particular high separation efficiencies for heavy metals, dioxins and furans. In continuous use neither ignition nor selfheating phenomena are observed, and there is no sooting and caking. Nascent heat of adsorption is absorbed by the inert material and dissipated, so that there is no accumulation of heat.

The gas may vertically or horizontally flow through the bed, which consists of the granular mixture of the high-carbon material and the inert material. The bed is usually provided in a container as fixed bed or as moving bed. It was found to be expedient to pass the gas through the bed at an empty-tube flow rate of 0.1 to 0.5 m/sec. The dwell time of the gas in the bed depends on the concentration of the substances to be separated and usually lies in the range from 0.5 to 5 sec.

Examples for the high-carbon material to be used include activated carbon, activated coke or lignite coke. The high-carbon material may be impregnated, e.g. with sulfur or sulfur compounds. As inert material, there may be used e.g. siliceous rock, pumice, lava, slag, vitrification residues or fine gravel. The content of high-carbon material in the bed is 5 to 80 wt-% and preferably 20 to 75 wt-%. While the gas stream is passed through the bed, the temperatures in the bed are 20 to 200° C. The inert material should be hydrophobic. The absorption of water by the inert material preferably lies below 15 wt-% in the state of equilibrium with a gas of 65% relative humidity.

The high-carbon material, which is used for the bed, and also the inert material, have grain sizes in the range from 0.5 to 10 mm. Preferably, the inert material has slightly coarser grains, where at least 80 wt-% have grain sizes in the range from 1 to 6 mm.

With different mixing ratios the Hg separation in beds in accordance with the invention was measured. With a content of only 30 wt-% formed activated carbon and a gas dwell time of only one second, degrees of separation for instance for mercury compounds or for metallic mercury larger than 99% could be detected over an extended period. Thus, the mixture need only contain a small amount of carbonaceous material. The mixture in addition has the advantage that separation efficiencies may be varied within wide limits by adjusting the mixing ratio. This results in a high flexibility, also with regard to the layer thickness and the directly related loss in gas pressure. Moreover, the use of coarse-grained materials, e.g. formed activated carbon, also provides for an additional impregnation with sulfur, so as to achieve even higher separation efficiencies or also the selective separation of elementary heavy metals of high vapor pressure, above all mercury.

Such a fixed bed as last stage before the chimney can thus also perform the function of a safety filter for all noxious substances in the case of breakthroughs from the preceding exhaust gas cleaning, and also operates as filter for residual dust. The inert material only absorbs small amounts of $SO_2$ and forms only few percent of sulfuric acid. Due to the storage capacity of the activated carbon on the one hand and the separating effect of the inert material on the other hand the penetration of moisture into the bed and the agglutination as a result of sooting are avoided. It was found out that even when the activated carbon was loaded with more than 70 wt-% sulfuric acid no effect of sooting was observed. When pure activated carbon or activated coke is used, sooting will already start with much smaller acid concentrations.

The "Bundesanstalt für Materialforschung und -prüfung" of Berlin examined mixtures of activated carbon and volcanic rock (lava) with weight ratios of 70:30, 50:50 and 30:70. No signs were found for the occurrence of dangerous temperature build-ups with the possibility of self-ignition.

EXAMPLE 1

In a long-term test over 18 months the exhaust gas of a large-scale waste incineration plant was passed through an adsorption filter whose fixed bed was a mixture of 30 wt-% activated carbon and 70 wt-% lava. At the end of the test the separation efficiency for Hg and Hg compounds still was more than 95%, and there was observed no sooting, no rise in temperature and no formation of CO.

EXAMPLE 2

In the laboratory test, the bed consists of 70 wt-% pumice with a grain size of 2–6 mm and 30 wt-% activated carbon with a grain size of about 4 mm. $HgCl_2$-containing air is passed upwards through the bed, and after 700 hours the $HgCl_2$ concentration is reduced.

Bed diameter: 36 mm
Height of bed: 360 mm
Temperature in the bed: 80° C.

Temperature in the gas: 60° C.
Gas flow rate, effective: 30 cm/sec

The following is measured (Hg—A = Hg content at the inlet
Hg—B = Hg content at the outlet):

| Operating time (h) | Hg—A ($\mu g/m^3$) | Hg—B ($\mu g/m^3$) | Separation (%) |
|---|---|---|---|
| 70 | 273 | 1 | 99.6 |
| 550 | 271 | 1 | 99.6 |
| 715 | 113 | 2 | 98.2 |
| 932 | 113 | 2 | 98.2 |

EXAMPLE 3

In a further laboratory test the temperature of the $HgCl_2$-containing gas is 70° C., and the procedure is as in Example 2. The following results were obtained:

| Operating time (h) | Hg—A ($\mu g/m^3$) | Hg—B ($\mu g/m^3$) | Separation (%) |
|---|---|---|---|
| 240 | 60 | 1 | 98.3 |
| 1595 | 98 | 1.8 | 98.2 |
| 2095 | 91 | 1 | 98.9 |
| 3072 | 130 | 1.6 | 99.2 |
| 3720 | 137 | 1 | 99.2 |
| 4647 | 129 | 1 | 99.2 |
| 6110 | 128 | 1.5 | 99.8 |
| 6686 | 171 | 1 | 99.4 |
| 7690 | 93 | 1 | 98.9 |

We claim:

1. A method of separating noxious substances from an exhaust gas stream wherein said gas stream is passed through a fixed bed or moving bed formed by a mixture of two granular materials having grain sizes in the range from 0.5 to 10 mm, one of said granular materials being a high-carbon material selected from the group consisting of activated carbon, activated coke and lignite coke, the second of said granular materials being an inert material selected from the group consisting of silicious rock, pumice, lava, slag, vitrification residue and fine gravel, the bulk density of said inert material being 0.8 to 3 times the bulk density of said high-carbon material, at least 80 percent by weight of said inert material having grain sizes in the range from 1 to 6 mm, 5 to 80 percent by weight of the granular materials in said bed being said high-carbon material and 95 to 20 percent by weight of said granular materials in said bed being said inert material, and wherein the grains of said high-carbon material do not include and do not stick together with the grains of said inert material, and wherein the temperature in said fixed bed or moving bed is 20 to 200° C. while the gas stream is passed therethrough.

2. The method of claim 1, wherein 20 to 75 percent by weight of the granular materials in said bed are said high-carbon material and the balance is said inert material.

3. The method of claim 1, wherein the bed is in a container and the exhaust gas flows through the bed in a vertical or horizontal direction.

4. The method of claim 1, wherein said noxious substances are heavy metals, heavy metal compounds, polycyclic aromatic hydrocarbons, polynuclear aromatic hydrocarbons, or a combination therefor.

5. The method of claim 1, wherein said noxious substances are elementary heavy metals and said high-carbon material is at least partly impregnated with sulfur.

6. A method for removing noxious substances selected from the group consisting of mercury, mercury compounds, polycyclic aromatic compounds, polynuclear aromatic compounds, heavy metals and heavy metal compounds from an exhaust gas stream wherein said gas stream is passed through a granular adsorbent bed consisting of a granular mixture of granular high-carbon material, optionally impregnated with sulphur, and a granular inert material having a bulk density which is 0.8 to 3 times the bulk density of said high-carbon material.

* * * * *